Sept. 9, 1952     O. H. BANKER     2,610,065
AUTOMATIC CHUCK
Filed May 10, 1947     2 SHEETS—SHEET 1
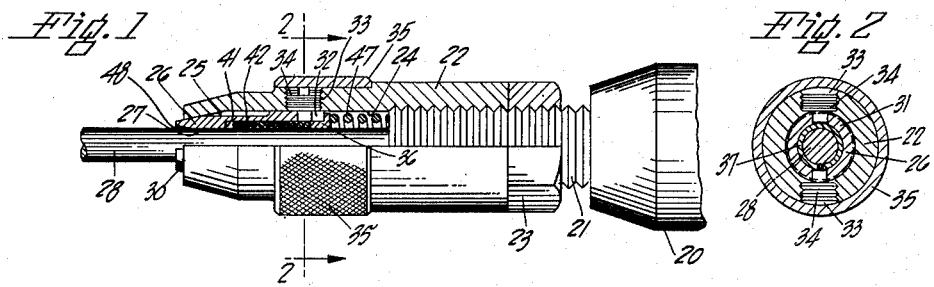
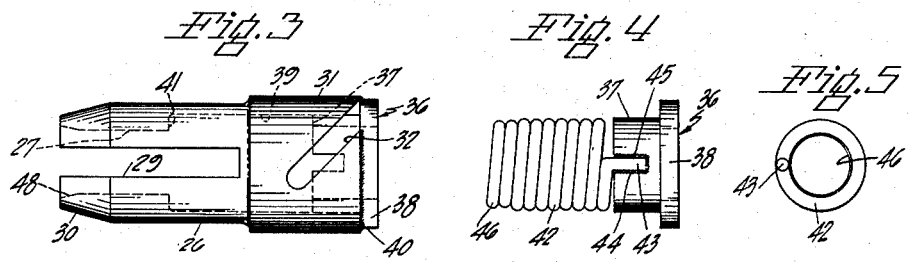
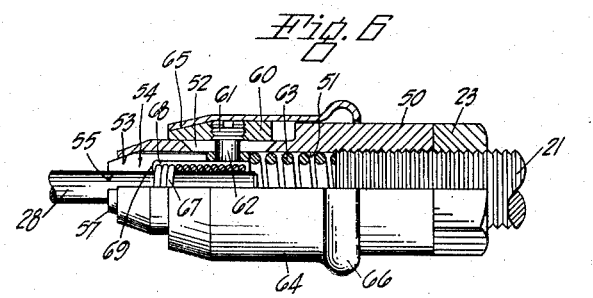
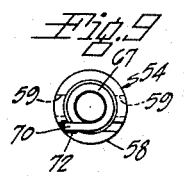
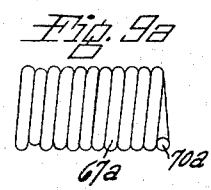
INVENTOR.
Oscar H. Banker
BY
Attys.

Sept. 9, 1952  O. H. BANKER  2,610,065
AUTOMATIC CHUCK
Filed May 10, 1947  2 SHEETS—SHEET 2
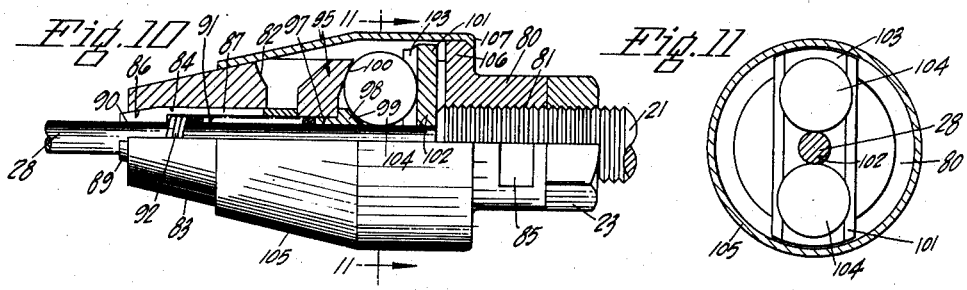
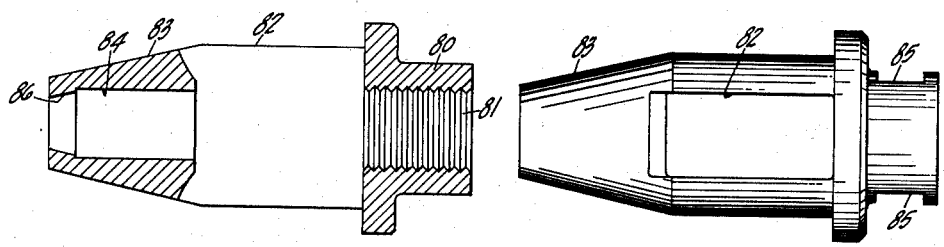
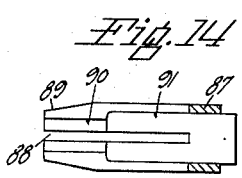
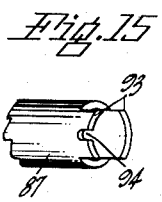
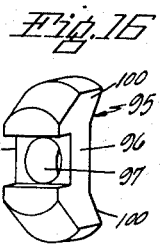
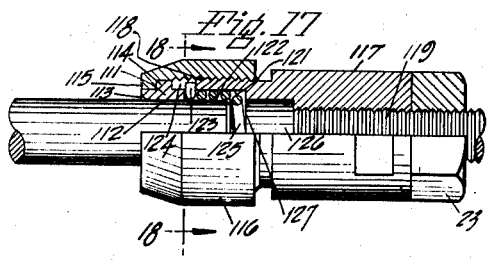
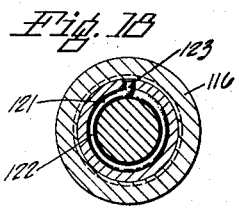
INVENTOR.
Oscar H. Banker
BY
Attys.

Patented Sept. 9, 1952

2,610,065

UNITED STATES PATENT OFFICE 2,610,065

AUTOMATIC CHUCK

Oscar H. Banker, Evanston, Ill.

Application May 10, 1947, Serial No. 747,236

6 Claims. (Cl. 279—23)

The invention relates to an automatic chuck for driving rotatable elements such as tools or spindles of food and drink mixers and other household utilities that have removable driven elements.

The principal object of the invention is to provide a chuck of the type referred to which has an improved clutching means for connecting the driven element in driving relation to the rotating chuck body and in this respect seeks to overcome the disadvantages inherent in chucks of the type heretofore known. In one such prior chuck the clutching action between the rotating chuck body and driven element is dependent upon mechanism including centrifugal weights operable in response to high speed rotation of the chuck body. A chuck of this type has one important disadvantage; namely, the clutching device tends to lose its grip on the driven element whenever the speed of the chuck is reduced below a certain rate, as will occur in the event that an extraordinary load is placed upon the driven element. This disadvantage is characteristic of any chuck that depends upon high speed rotation for the efficiency of the clutching action between the chuck body and the driven element. It is an important object of the invention to eliminate this disadvantage by the provision of clutch means that functions at peak efficiency even during relatively low speed operation of the chuck and even though an abnormal load is placed upon the driven element. It is likewise an important object to provide an improved clutching means operable to increase its clutching action or grip on the driven element in response to any tendency of the chuck body to overrun the driven element.

The invention in its specific aspects aims to provide clutch means comprising a torsionally resilient element preferably in the form of a coil spring wound or wrapped in the direction opposite to the normal direction of rotation of the clutch body and adapted to grip the driven element, the reverse winding of the torsionally resilient element serving to increase the wrapping grip on the driven element as the chuck body is rotated. In its other aspects the invention provides a chuck of novel construction that embodies relatively few operating parts compactly arranged and substantially trouble free in operation. Another object of the invention is to provide a chuck including a chuck body having a collet carried for axial movement therein and including a compression spring which urges the collet in cooperating engagement with a portion of the chuck body to compress or constrict the collet for increasing the grip of the collet on the driven element, and further to associate such chuck with a threaded driving shaft in such manner that the chuck body may be adjustably positioned on such shaft to adjust the compression on the aforesaid spring.

The foregoing and other important objects and features of the invention will become apparent as the disclosure is more fully made in the following detailed description and accompanying sheets of drawings in which:

Fig. 1 is a side elevational view, one-half of which is in section, of one form of the improved automatic chuck; Fig. 2 is a transverse sectional view taken on the line 2—2 of Fig. 1; Fig. 3 is a view showing the assembly of the collet and associated collar, the view being drawn to twice the scale of that of Figs. 1 and 2; Fig. 4 is a view showing the assembly of the clutching spring and associated collar, the scale of this view being the same as that of the parts in Fig. 3; Fig. 5 is a rear end elevation of the clutching spring shown in Fig. 4, the view being drawn to the same scale as that used in Figs. 3 and 4.

Fig. 6 is a view similar to Fig. 1 but showing a modified form of the invention; Fig. 7 is a detailed view of the collet used in the construction of Fig. 6; Fig. 8 is a side view of the clutching spring used in the construction of Fig. 6, the spring being shown in a scale twice that of Fig. 6; Fig. 9 is a rear view of the assembly of the clutching spring of Fig. 8 and the collet of Fig. 7, Figs. 7 and 9 being drawn to the same scale.

Fig. 9a is a view of a modified form of spring substitutable for that shown in Fig. 8; Fig. 10 is a partial sectional view of a still further modified form of chuck; Fig. 11 is a transverse sectional view taken on the line 11—11 of Fig. 10; Fig. 12 is a longitudinal sectional view through the chuck body of Fig. 10; Fig. 13 is a plan view of the chuck body; Fig. 14 is a longitudinal sectional view of the collet of the construction of Fig. 10; Fig. 15 is a fragmentary perspective view showing the rear end portion of the collet of Fig. 14; Fig. 16 is a perspective view of one of the driving plates of the construction shown in Fig. 10.

Fig. 17 is a partial sectional view of another form of the invention; Fig. 18 is a transverse sectional view taken on the line 18—18 of Fig. 17.

Although reference herein is made to the chuck in connection with its use in certain instances, it should be understood that the principles of the invention have wider applicability. Likewise, the particularity with which the detailed structures of the various modifications of the invention are pointed out should be taken as illustrating and not limiting the invention.

*Figs. 1, 2, 3, 4 and 5*

The chuck of Fig. 1 is adapted to be rotated by any suitable source of power. The source is herein illustrated as comprising an electric motor, a portion of which is designated by the numeral 20. The motor may have an externally threaded driving shaft 21. A chuck body 22 is internally threaded to receive the threaded shaft 21. A lock nut 23 is also threaded on the shaft 21 and engages the rear end of the chuck body for securing the chuck body to the shaft 21 for rotation therewith.

The chuck body includes an axially directed pocket in the form of an axial bore 24, which bore may be formed entirely through the chuck body and may include the portion that is subsequently tapped to provide the internal threads that engage the threaded driving shaft 21. The front end of the chuck body 22 is tapered radially inwardly as at 25, for a purpose to presently appear.

A collet 26 is carried in the pocket or bore 24 of the chuck body and is arranged for limited fore and aft axial movement therein. The collet is provided with an axial bore 27 adapted to receive a rotatable driven element 28 such as a tool or other rotatable spindle. The collet is further provided with a plurality of longitudinal circumferentially spaced slits 29 by means of which the forward portion of the collet is flexible so that it may be radially compressed or constricted to grip the spindle 28. The outer periphery of the forward portion of the collet is tapered as at 30 and is engageable with the taper 25 of the chuck body bore so that movement of the collet axially forwardly with respect to the chuck body results in a wedging relation between the tapered portions 30 and 25 for compressing or constricting the collet about the spindle. The construction of the chuck body and collet is such that the element or spindle 28 may pass completely through the collet and may abut the front radial face of the driving shaft 21.

The rear portion of the collet is formed of a diameter substantially larger than the forward portion to provide a cylindrical surface 31. This cylindrical surface provides a pilot area by means of which the collet is centered in the chuck body bore 24. This surface is preferably finished or polished so that the collet may have free fore and aft axial movement in the bore 24. The rear portion of the collet is provided with a pair of substantially diametrically opposed helical or spiral slots or grooves 32 (one of which appears in Fig. 3). These slots or grooves provide cam tracks that extend generally circumferentially and axially of the collet and are cut through that portion of the collet that includes the cylindrical surface 31. As best shown in Fig. 2, the chuck body 22 is provided with a pair of diametrically opposed tapped bores 33, each of which receives a screw 34 having an integral end portion providing a stud or follower engageable with the proximate cam track or groove 32 in the collet 26.

The normal direction of rotation of the chuck body by the motor shaft 21 is right-hand or clockwise as viewed from the motor end of the chuck. The spiral or helical grooves or tracks 32 are cut left-hand or counterclockwise, whereby any tendency of the rotating chuck body 22 to overrun the collet 26 will cause the collet to be driven forwardly with the result that the aforesaid wedging action between the tapered portions 25 and 30 occurs to effect compression or constriction of the forward portion of the collet on the element or spindle 28.

The chuck body 22 is provided with a sleeve or band 35 that encircles the chuck body about that portion thereof in which the screws 34 are carried. This band or sleeve is mounted on the chuck body 22 by a press fit so that it is not readily displaceable. The band 35 serves to prevent any tendency of the screws 34 to become dislodged by reason of centrifugal force incident to high speed rotation of the chuck.

The chuck further includes within its bore 24 a collar 36 having an annular sleeve portion 37 and an integral annular radial flange 38. The sleeve portion 37 fits within a counterbore 39 of the collet 26 and the front face of the radial flange 38 abuts the rear end of the enlarged cylindrical portion 31 of the collet and is brazed or soldered thereto as at 40 (Fig. 3). It will be understood, of course, that any other suitable method may be employed for connecting the collar 36 to the collet 26 for rotation therewith. The counterbore 39 in the collet 26 is somewhat larger than the bore 27 previously described and the junction between the bore 26 and counterbore 39 provides a shoulder 41.

The counterbore 39 carries therewithin a clutching device in the form of a coil spring 42. This spring abuts at its rear end against the front face of the sleeve portion 37 of the collar 36 and the last turn of the spring is provided with a rearward axial projecting portion 43 which is received by a slot 44 in the sleeve portion 37 of the collar 36. The spring is connected to the collar 36 for rotation therewith by means of the projecting portion 43, a positive connection between the parts being effected by means of brazing or soldering as at 45 (Fig. 4). It will be understood that other means may be utilized to effect the connection between the spring 42 and collar 36; however, the present method is found to be highly effective. The spring 42 has a nominal uniform inside diameter of a size sufficient to relatively loosely receive the element or spindle 28, which, as aforesaid, passes completely through the collet to abut the driving shaft 21. The spindle, of course, likewise passes through the spring 42 and collar 36. By this arrangement the spring 42 is supported against radially inward distortion by the element 28 and against radially outward distortion by that portion of the collet providing the counterbore 39. The two coils at the forward end of the spring 42 are slightly reduced in inside diameter as at 46 (Figs. 4 and 5) to relatively tightly grip or establish frictional engagement with the spindle 28. This arrangement provides a clutching arrangement between the spring 42 and the spindle. The spring 42 is wound left-hand or in a direction opposite to the normal direction of rotation of the chuck body 22. Any tendency of the chuck body to overrun the spindle 28 will cause wrapping of the spring 42 about the spindle 28 so that the grip or clutching action of the spring 42 on the spindle is increased. It will thus be seen that the spindle 28 will not slip in the chuck even though it is operated under overload conditions.

A second coil spring 47 of a size substantially larger than the spring 42 surrounds the rear portion of the spindle 28 and is placed under compression between the front radial face of the motor shaft 21 and the rear radial face of the flange 38 on the collar 36. This spring, although relatively light, tends to urge the collet 26 forwardly so that the tapered front end portion 30 thereof engages the inside taper 25 on the bore 24 of the chuck body 22. The bore 27 of the collet is provided at its extreme forward end with an outwardly tapering or countersunk portion 48 by means of which insertion of the spindle into the chuck is facilitated. When the parts of the chuck are at rest, the tendency of the collet 26 will be to assume a neutral position with respect to the relationship between the cam tracks 32 and follower screws or studs 34, except insofar as the collet is urged forwardly by extension of the compression spring 47. Because of the tapered portion 48 at the front end of the collet bore 27, the spindle 28 may be easily inserted into the collet. The action of inserting the spindle 28 will tend to move the collet rearwardly and relieve the wedging action of the tapered surface 25 thereon, thus further facilitating insertion of the spindle. The coils of the clutching spring 42 normally lie one against the other and no difficulty is experienced in moving the spindle 28 axially rearwardly through this spring, inasmuch as the rear end of the spring abuts the front of the collar 36 and the collar 36 is in turn abutted by the compression spring 47.

When the spindle 28 is withdrawn from the chuck, there is no undue elongation of the spring 42 caused by frictional drag of the reduced coils 46 thereof on the spindle 28, inasmuch as the front coil of the spring may abut the shoulder 41 formed at the junction of the bore 27 and counterbore 39. The shoulder 41 thus serves to strip the spring 42 from the spindle 28 as the spindle is withdrawn from the chuck.

Since the chuck body 22 is adjustably positionable on the motor shaft 21, and since the spring 47 abuts the front end of the motor shaft, compression on the spring 47 may be varied by adjusting the chuck body on the shaft and the adjusted position of the chuck body may be secured by means of the lock nut 23.

Figs. 6, 7, 8 and 9

The chuck construction of this modified form of the invention is similar in some respects to that previously described. For the purpose of simplicity in the description, the chuck will be described in connection with its use with a motor or driving shaft of the type shown in Fig. 1 and the same reference character 21 will be used to designate the shaft. The chuck body is shown at 50 as having an axial pocket or bore 51 the rear end of which is internally threaded to receive the driving shaft 21. The lock nut 23 is associated with the shaft and chuck body 50 in the same manner that the corresponding parts are associated in Fig. 1. The chuck body further includes a plurality of longitudinally extending slots 52 (only one of which is shown in Fig. 6) opening radially outwardly from the axial bore 51. The forward end of the bore 51 is radially inwardly tapered as at 53. A collet 54, shown in detail in Fig. 7, is carried in the bore 51 for limited fore and aft axial movement with respect to the chuck body 50. The collet has an axial bore 55 for receiving the rotatable driven element 28 and at its forward end is longitudinally split as at 56 so that its flexible end may be radially compressed or constricted to grip the element 28. The forward portion of the collet is provided with an external taper 57 which cooperates with the internal taper 53 of the chuck body bore 51 to accomplish a wedging action on the collet when the collet is moved axially forwardly in the chuck body 50. The rear end portion of the collet includes a portion of increased diameter to provide a cylindrical surface 58 which is associated with the chuck body bore 51 for the purpose of centering and piloting the collet in the chuck body, the arrangement being similar to the construction of Fig. 1. The enlarged cylindrical portion 58 of the collet is provided with a pair of diametrically opposed radial bores 59 (only one of which is shown) which are generally in radial alignment with the slots 52 in the chuck body 50. A band 60 axially slidably encircles that portion of the chuck body 50 in which the slots 52 are formed. This band is provided with a pair of diametrically opposed tapped bores (only one of which is shown) and each bore carries a screw 61 having a radially inwardly extending stud portion 62 which enters the proximate bore or opening 59 in the collet 54. By means of the construction thus far described, the collet 54, together with the band 60, may have limited fore and aft movement with respect to the chuck body, the slots 52 in the chuck body being sufficiently long to permit this movement. A compression spring 63 is interposed between the front radial face of the motor shaft 21 and the rear of the collet 54. The function of the spring is to urge the collet 54 normally axially forwardly so that the wedging action between the tapers 53 and 57 is accomplished. The band 60 carries a sleeve 64, the forward portion of which is tapered at 65 and spun onto a complementary taper on the forward end of the band 60. The sleeve 64 receives the band 60 in a press fit so that the two parts may move axially together. The rear portion of the sleeve 64 is enlarged at 66 to provide a portion adapted to be gripped by an operator for moving the band 60 and collet 54 rearwardly against compression of the spring 63, so that the forward portion of the collet is released from the taper 53 of the chuck body bore 51 to release the grip of the collet on the element 28, thus permitting withdrawal of the element.

The chuck further includes a driving device or clutch between the collet 54 and rotatable element 28. This device takes the form here of a coil spring 67 constructed very much like the coil spring of the chuck of Figs. 1 to 5. The spring 67 is shown by itself in Fig. 8. The front two turns or coils of the spring 67 are reduced in inside diameter to relatively tightly receive the rotatable element 28. The spring 67 encircles the element 28 within a counterbore 68 formed in the collet 54. The counterbore is somewhat larger than the bore 55 and a shoulder 69 is formed at the junction thereof with the bore. The rear end of the spring 67 includes a tangential projection 70 which is received in a slot 71 formed in the enlarged cylindrical portion 58 of the collet. This projection may be soldered or brazed as at 72 (Fig. 9) to the collet. The spring, encircling the inner or rear end of the driven element 28, is supported thereon against distortion radially inwardly and is supported against radially outward distortion by means of being confined within the counterbore 68 of the collet.

The coils of the spring 67 are wound left-hand or in the direction opposite to the normal direction of rotation of the chuck body 50. The collet 54 is connected to the chuck body 50 for rotation therewith by means of the screws 61 which engage the chuck body along the portions thereof that border the slots 52. Since the spring 67 is connected to the collet 54 by means of the projection 70, the spring will tend to rotate with the collet and any tendency of the chuck body 50 to overrun the driven element 28 will cause the spring to wrap more tightly about and to increase its grip on the element, the reduced-diameter coils at the front end of the spring giving the spring an initial clutching grip on the element.

Compression on the spring 63 may be varied by means of adjusting the chuck body 50 on the threaded motor shaft 21 and securing this position by means of the lock nut 23, as in the construction of Fig. 1. However, whereas the spring 47 of Fig. 1 is relatively light and gripping engagement of the collet 26 on the element 28 depends in part upon the axial forward movement of the collet 26 by means of the spiral tracks 32 and followers 34 and in part on the clutching action of the clutch spring 42, the compression spring 63 of Fig. 6 is relatively stronger, inasmuch as the latter spring must serve in part as the means for driving the collet 54 axially forwardly so that the wedging action between the tapers 53 and 57 accomplishes compression or constriction of the collet 54 on the element 28.

The shoulder 69 at the junction of the bore 55 and counterbore 68 in the collet 54 serves to engage the spring 67 to strip the spring from the element 28 as the element is withdrawn from the chuck.

The sleeve 64 on the band 60 serves to retain the screws 61 against radial displacement incident to rotation of the chuck. This sleeve may be polished or otherwise finished to furnish a desirable exterior appearance to the chuck.

Fig. 9a

This view shows a modified form of clutch spring 67a corresponding to the spring 67 but having the next to the last entrance-end turn reduced in diameter instead of the last two turns. This facilitates insertion of the tool shank because of the large diameter last turn serves as a centering guide for the inserted end of the tool.

Figs. 10, 11, 12, 13, 14, 15 and 16

The chuck comprising this modified form of the invention includes a chuck body 80 provided at one end with an internally threaded bore 81 by means of which the chuck body may be carried on the motor shaft 21. The chuck body further includes an intermediate pocket 82 which opens radially outwardly at diametrically opposed portions of the chuck body. The forward external surface of the chuck body is tapered forwardly as at 83 and this portion is provided with an axial bore 84 coaxial with the internally threaded bore 81. The rear portion of the chuck body 80 is provided at opposite sides with flat portions 85 by means of which a wrench or other tool may be applied to the chuck body in the mounting of the body on the shaft 21. The forward portion of the axial bore 84 is tapered as at 86. A collet 87 (Fig. 14) is carried in the bore 84 and the forward portion thereof is split as at 88 to provide for radial compression or constriction of the collet as a wedging action is accomplished between the internal taper 86 of the bore 84 and an external taper 89 at the forward end of the collet. The collet is provided with an axial bore 90 and an enlarged counterbore 91. The bore 90 receives the rotatable element 28, which element may be inserted through the bore 90 and through the counterbore 91 of the collet sufficiently far into the chuck until the rear end of the element encounters the front radial face of the motor shaft 21. A clutching device in the form of a coil spring 92 is carried within the counterbore 91 of the collet 87 and encircles the rotatable element 28. This spring, like the springs 42 and 67 of Figs. 1 and 6 respectively, has its front two coils formed of reduced inside diameter to effect a clutching or gripping action on the element 28. The remaining coils of the spring are of a nominal uniform diameter sufficiently large to relatively loosely permit the element 28 to pass therethrough.

The rear end of the collet 87 is provided with a pair of axially rearwardly extending portions in the form of driving lugs 93, one of which is slotted at 94. The rear end of the spring 92 may include a projection on the order of that formed on the spring 67 of Fig. 6. This projection may engage the slot 94 in one driving lug 93 to connect the spring to the collet for rotation therewith. This specific connection of the spring 92 to the collet 87 has not been shown, inasmuch as it may be readily understood from a description of what has been described before. By means that will be hereinafter described, the collet 87 is connected to the chuck body 80 for rotation therewith. The spring 92, like the springs 42 and 67 previously described, is wound left-hand or in the direction opposite to the normal direction of rotation of the chuck body so that any tendency of the chuck body to overrun the element 28 will serve to increase the grip of the spring 92 on the element.

The shoulder provided at the junction of the bore 90 and counterbore 91 of the collet 87 provides means for engaging the spring 92 to strip the spring from the element 28 as the element is withdrawn from the chuck.

The chuck shown in this modification of the invention includes means responsive to centrifugal force incident to rotation of the chuck to increase the grip of the collet 87 on the element 28. This means includes a first drive member 95, shown by itself in Fig. 16. This member includes diametrically opposed flat sides 96 which are embraced by the driving lugs 93 on the collet 87. The member 95 is of sufficient length diametrically of the chuck body 80 so that opposite ends thereof extend radially through opposite sides of the pocket 82, whereby the end portions of the flat sides 96 engage in driving relation with those portions of the chuck body bordering on the pocket 82. The member 95 is centrally apertured at 97 so that the rear end portion of the driving element 28 may pass therethrough (Fig. 10). The aperture 97 is considerably larger than the element 28 and receives a bushing 98. This bushing includes a sleeve portion that is received in a press fit by the aperture 97 so that the member 95 and bushing 98 are constrained for rotation and axial movement together. The forward face of the sleeve portion of the bushing 98 serves also as means against which the rear end of the clutch spring 92 may abut. The inside diameter of the bore in the bushing 98 is such as to receive the element 28 in a sliding fit and thus serves as means for additionally centering and supporting the element. The supporting relationship between the element and the bushing is mutual, inasmuch as the latter is supported on the former and still further serves to center and retain the drive member 95.

The rear portion of the bushing 98 is provided with a rearwardly and inwardly tapering face 99. Each of the opposite ends of the rear portion of the drive member 95 is provided with a rearwardly and outwardly tapering surface or cam face 100. A second drive member 101 is positioned in the chuck body adjacent the rear end of the slot or pocket 82. This member is apertured at 102 to receive the element 28 in a sliding fit and is further provided with a diametrically extending raceway 103. A pair of centrifugal weights in the form of balls 104 is carried in the raceway 103, the balls being normally separated by the tapered face 99 on the bushing 98, the balls being further disposed between the raceway 103 and the cam faces 100 on the drive member 95.

The relationship of the parts is such that rotation of the chuck will cause the balls 104 to move radially outwardly in response to centrifugal force. Outward movement of the balls, by virtue of engagement with the cam faces 100 on the drive member 95 will cause the drive member 95 to move axially forwardly or to the left as viewed in Fig. 10. This movement of the member 95 will effect forward axial movement of the collet 87 and will function to increase the grip of the collet on the element 28 by means of the constriction or compression of the forward end of the collet as the tapering surface 89 of the collet is wedged into the taper 86 of the chuck body bore 84. It will thus be seen that the grip of the collet 87 on the element 28 is in direct proportion to the speed of rotation of the chuck. Even though the grip of the collet 87 on the element 28 tends to relax during low speed operation of the chuck or during such times as the element 28 is overloaded, the clutch spring 92 will maintain driving connection between the chuck body 80 and the element.

The exterior of the chuck body is finished by a sleeve or thimble 105 which is tapered forwardly to correspond with the forward taper 83 on the chuck body. The rear end portion of the sleeve 105 is spun over an annular flange 106 on the chuck body as at 107. The sleeve 105 is thus secured to the chuck body 80 as effectively as if formed as a part thereof. The sleeve or thimble may be polished or otherwise finished to lend to the appearance of the assembled chuck.

Figs. 17 and 18

This form of the invention eliminates the collet and substitutes therefor, as a centering means for the tool shank 28, an annular guide member 111 having a pilot bore 112 with a flared entrance 113. Guide member 111 has an annular flange 114 clamped between a flange 115 on a retaining cap 116 and the front or left end of a centrally bored body 117.

Body 117, in addition to being threaded at 118 for attachment of the cap 116, is also internally threaded at 119 for attachment to a power-driven member as the armature shaft 21 in Figs. 1 and 6. A large diameter portion 121 of the bore in the body 117 provides a chamber for a helical clutch spring 122. The left end 123 of this spring is turned radially outwardly into a notch 124 in the end of the body 117 as an anchorage and for causing rotational force to be imparted to this end of the spring; see Fig. 18. The opposite end of the spring has a reduced diameter convolution 125 for initially gripping the tool shank as the latter is inserted therethrough into a pilot portion 126 of the body bore. A shoulder 127 between the bore portions 121 and 126 is abutted by the convolution 125, pursuant to forcing the end of the tool shank therethrough, and thereby prevents inordinate elongation of the spring while permitting expansion of such convolution. The direction of winding of the clutch spring is such that initial overrun of the device with respect to the tool shank will cause the spring convolutions to progressively grip the shank and ultimately establish a positive driving connection therewith. Inasmuch as the clutch spring convolutions between its anchored end and the reduced diameter convolutions will necessarily embrace the tool shank before these convolutions can be tightened, there is assurance that no partially inserted tool can initiate a contractual winding of unsupported convolutions with possible inordinate contraction and injury thereto.

In the other embodiments of the invention the jaws of the collet have the prime function of piloting the tool while the clutch spring constitutes the primary driving coupling for the tool. Although the collet jaws engage the tool for piloting at only one end of the clutch spring, the piloting function is well executed because of the jaws gripping the tool, i. e., there is no radial clearance between the tool and the pilot means. The absence of a gripping pilot means is compensated for in the present embodiment by the presence of the two complemental pilot means components 112 and 126 at opposite ends of the clutch spring.

In conclusion

The operation of each of the chucks disclosed herein has been set forth in connection with the foregoing description. It will be seen that in each form of the invention the improved chuck is characterized by means tending to eliminate any slippage between the chuck body and the driven element 28. In the form of the invention shown in Fig. 1 the clutch spring 42 serves in large part to establish the driving relationship between the chuck body and driven element. In addition, the grip of the collet 26 on the element 28 is increased by means of the spiral tracks 32 and followers 34 which function in response to any tendency of the chuck body to overrun the collet and element. In the chucks of Fig. 6 the clutching spring may operate in conjunction with the compression spring 63. In the chuck of Fig. 10, the clutch spring operates in conjunction with centrifugal force means operable in response to rotation of the chuck.

Other features of the invention will undoubtedly occur to those skilled in the art, as will various modifications and alterations in the construction of the preferred forms of the invention herein illustrated and described. It should be understood, of course, that such modifications and alterations may be made without departing from the fundamental principles of the invention and it is not desired that the invention be delimited by the exact structural forms set forth.

What is claimed is:

1. A driving member for connecting a chuck and a coaxial cylindrical rotatable element, comprising: a coil spring having a nominal inside diameter of such uniform size throughout a substantial axial length thereof as to loosely receive such element coaxially therein and including at one end thereof a portion of reduced inside diameter for relatively tightly receiving the element, and at the other end a portion adapted to be connected to a chuck in driving relation thereto.

2. A driving member for connecting a chuck and a coaxial cylindrical rotatable element, comprising: a coil spring having a majority of its coils of a nominal uniform inside diameter of such size as to relatively loosely receive such element coaxially therein and having certain of its coils at one end thereof reduced in inside diameter for relatively tightly gripping the element, the other end of the spring including a portion adapted to be connected to a chuck in driving relation thereto.

3. A driving member for connecting a chuck and a coaxial cylindrical rotatable element, comprising: a coil spring having a majority of its coils of a nominal uniform inside diameter of such size as to relatively loosely receive such element coaxially therein and having certain of its coils at one end thereof reduced in inside diameter for relatively tightly gripping the element, the last coil at the other end of the spring including a projecting portion adapted to be connected to a chuck in driving relation thereto.

4. A driving member for connecting a rotatable body with a cylindrical element to be driven coaxially with such body, comprising: a coil spring having a majority of its coils of a nominal uniform inside diameter such as to loosely receive the element when it is inserted endwise through an entrance end of such spring, and there being a portion of the coils spaced from such entrance end and of diminished diameter to initially grip onto the tool after it has entered such end and projected through said majority of coils.

5. In a driving chuck for a tool, a chuck body having an axial bore receivable of a shank of such tool, said bore having a clutch-receiving portion and a more inward portion of less diameter for piloting the tool shank and forming a shoulder between the bore portions, a helical clutch element in the clutch-receiving portion of the bore to axially receive the tool shank, the outer end of the clutch element being anchored for rotation with the chuck body while a more inward portion of such element is reduced in diameter to initially grip the tool shank and an intermediate portion of the element comprises coils of equal internal diameter for receiving the tool shank but being progressively grippable thereon in driving relation pursuant to an initial rotation of the reduced diameter portion with the tool relatively to the chuck body, and the inner end of the clutch element being adjacently to said shoulder for abutment thereagainst to prevent elongation of the element by the tool shank as it is projected therethrough toward the pilot bore portion.

6. In a driving chuck for a tool, a chuck body having an axial bore receivable of a shank of such tool, said bore having inner and outer tool shank pilot portions and a clutch-receiving portion between said pilot portions, the clutch-receiving portion being of greater diameter than the inner pilot portion to receive a helical clutch element and forming a shoulder at the inner end of said clutch-receiving portion, the outer end of the clutch element being anchored for rotation with the chuck body while a more inward portion of such element is reduced in diameter to initially grip the tool shank and an intermediate portion of the element comprises coils of equal internal diameter for receiving the tool shank but being progressively grippable thereon in driving relation pursuant to an initial rotation of the reduced diameter portion with the tool relatively to the chuck body, and the inner end of the clutch element being adjacently to said shoulder for abutment thereagainst to prevent elongation of the element by the tool shank as it is projected therethrough toward the inner pilot portion of the bore.

OSCAR H. BANKER.

REFERENCES CITED

The following references are of record in the file of this patent:

UNITED STATES PATENTS

| Number | Name | Date |
|---|---|---|
| 1,552,085 | Shiek | Sept. 1, 1925 |
| 1,800,254 | Holmes | Apr. 14, 1931 |
| 2,140,304 | Wishart | Dec. 30, 1938 |
| 2,367,863 | Grey | Jan. 23, 1945 |
| 2,467,606 | Young | Apr. 19, 1949 |

FOREIGN PATENTS

| Number | Country | Date |
|---|---|---|
| 109,561 | England | 1917 |